United States Patent Office 3,554,057
Patented Jan. 12, 1971

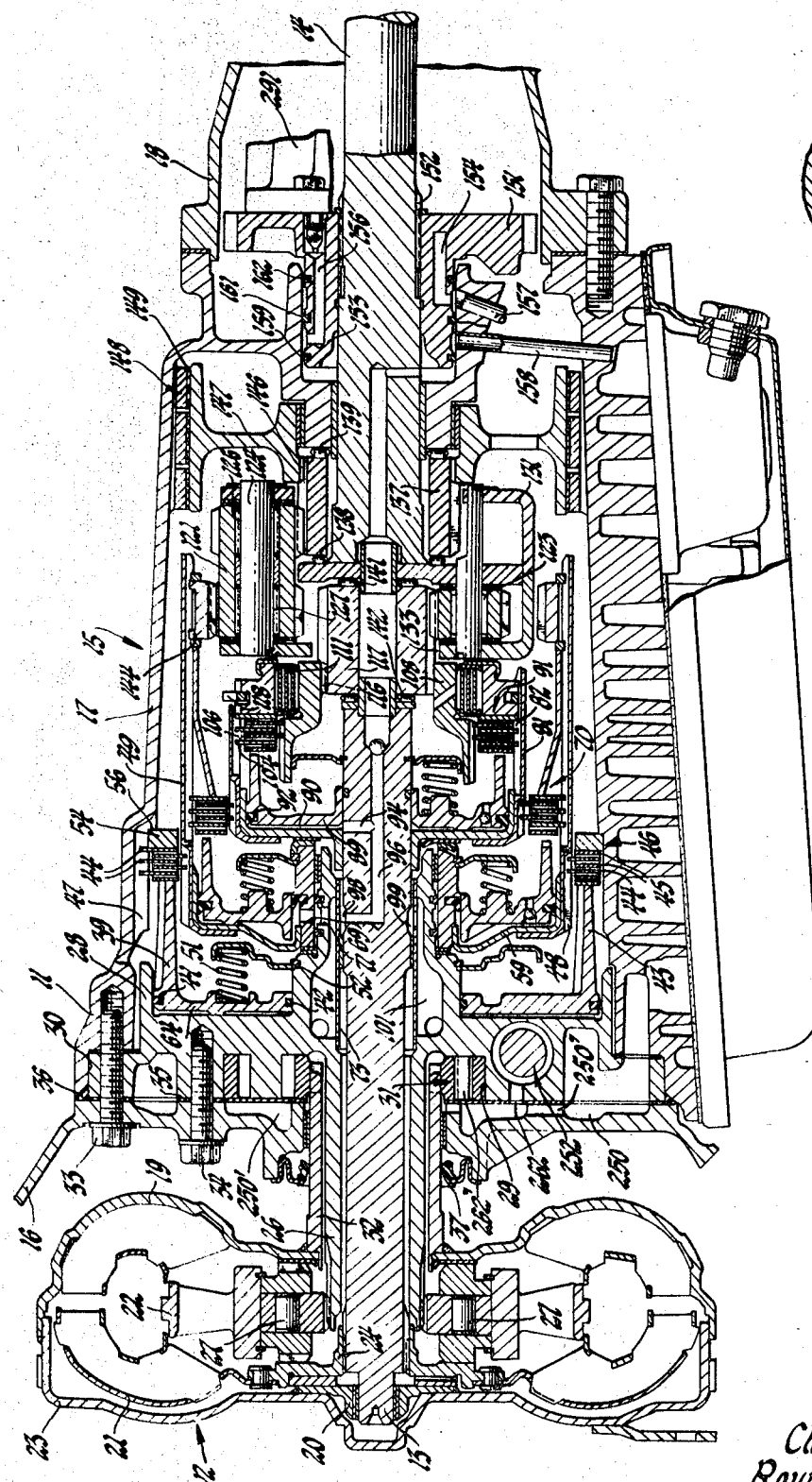

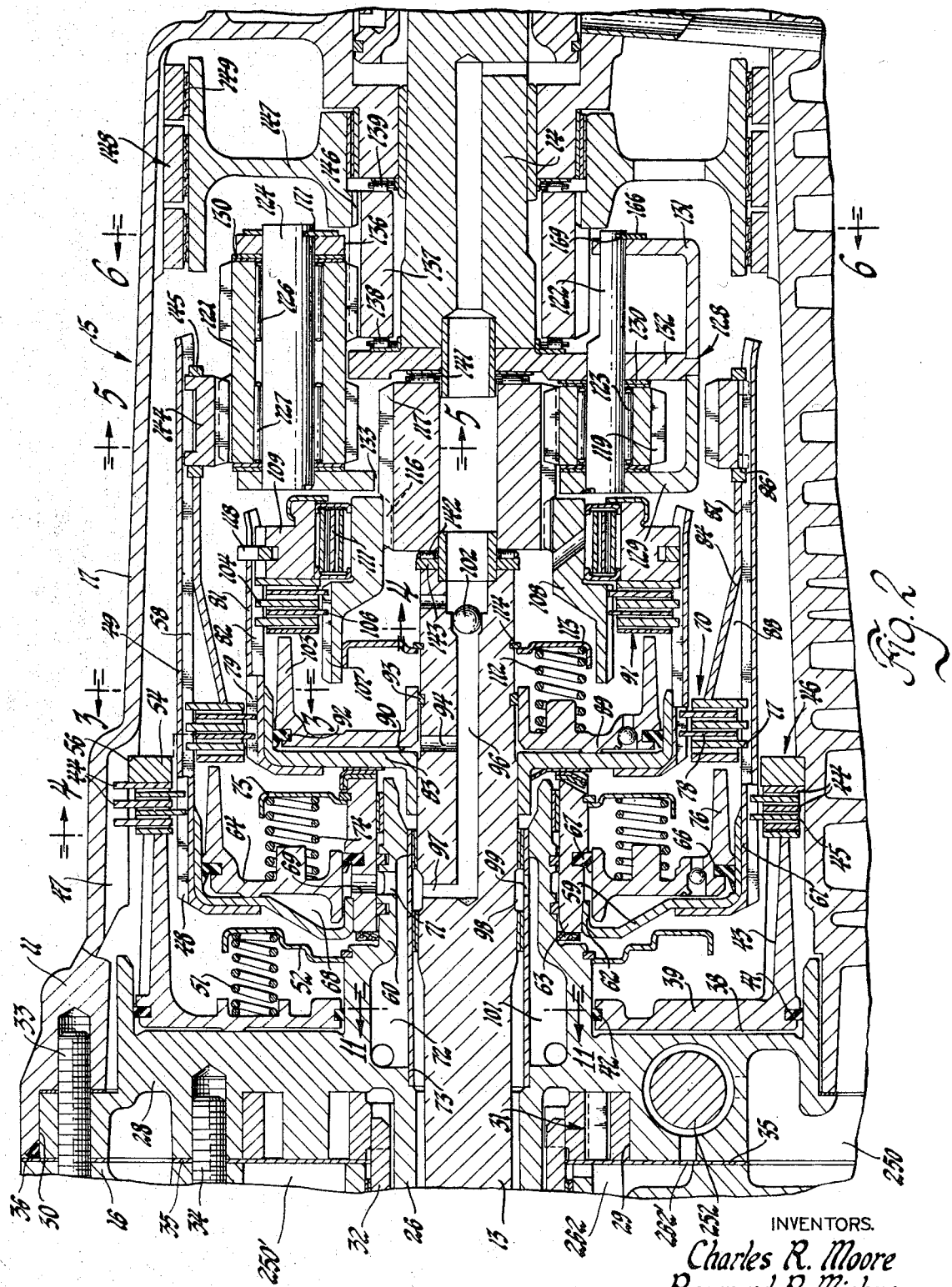

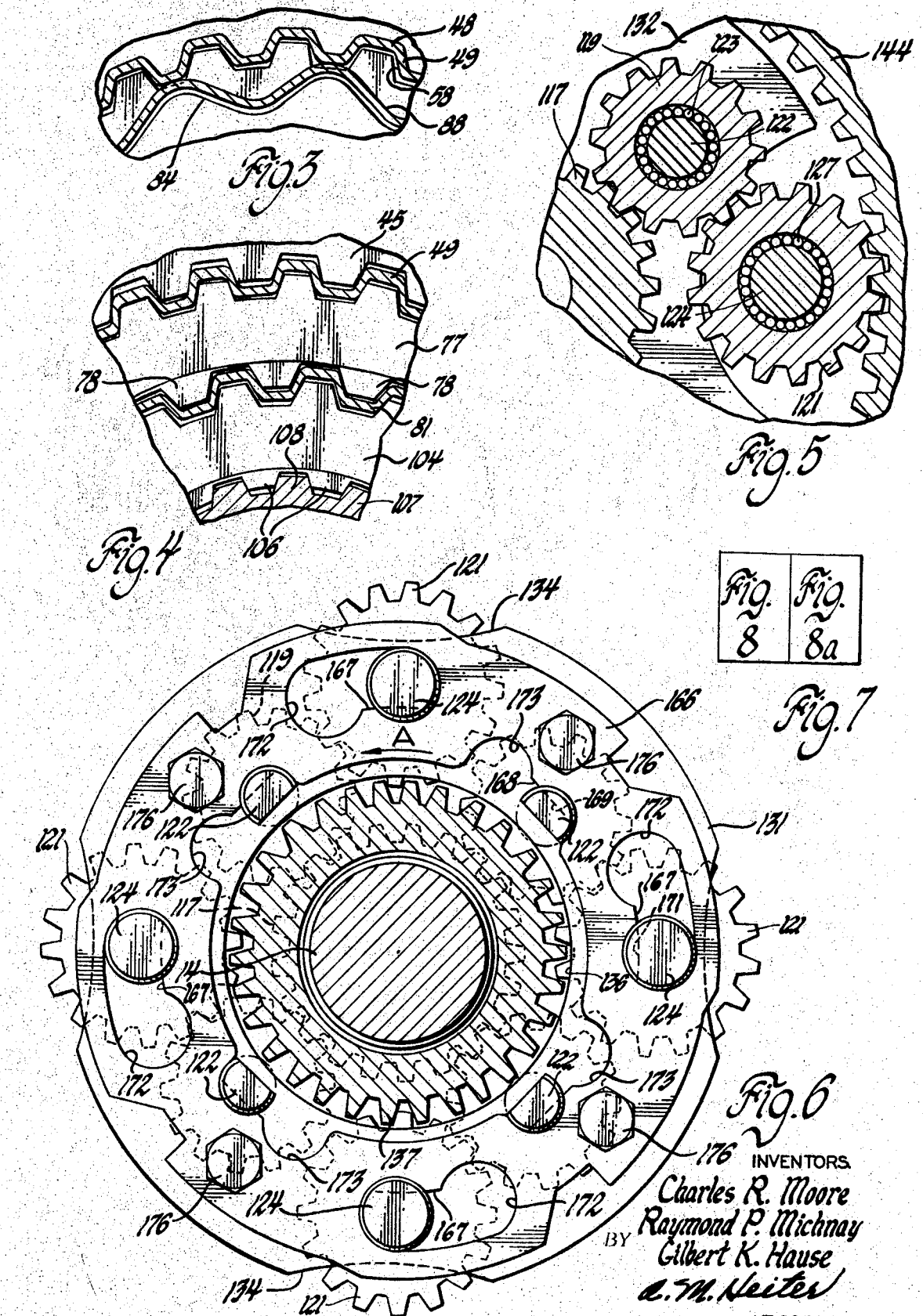

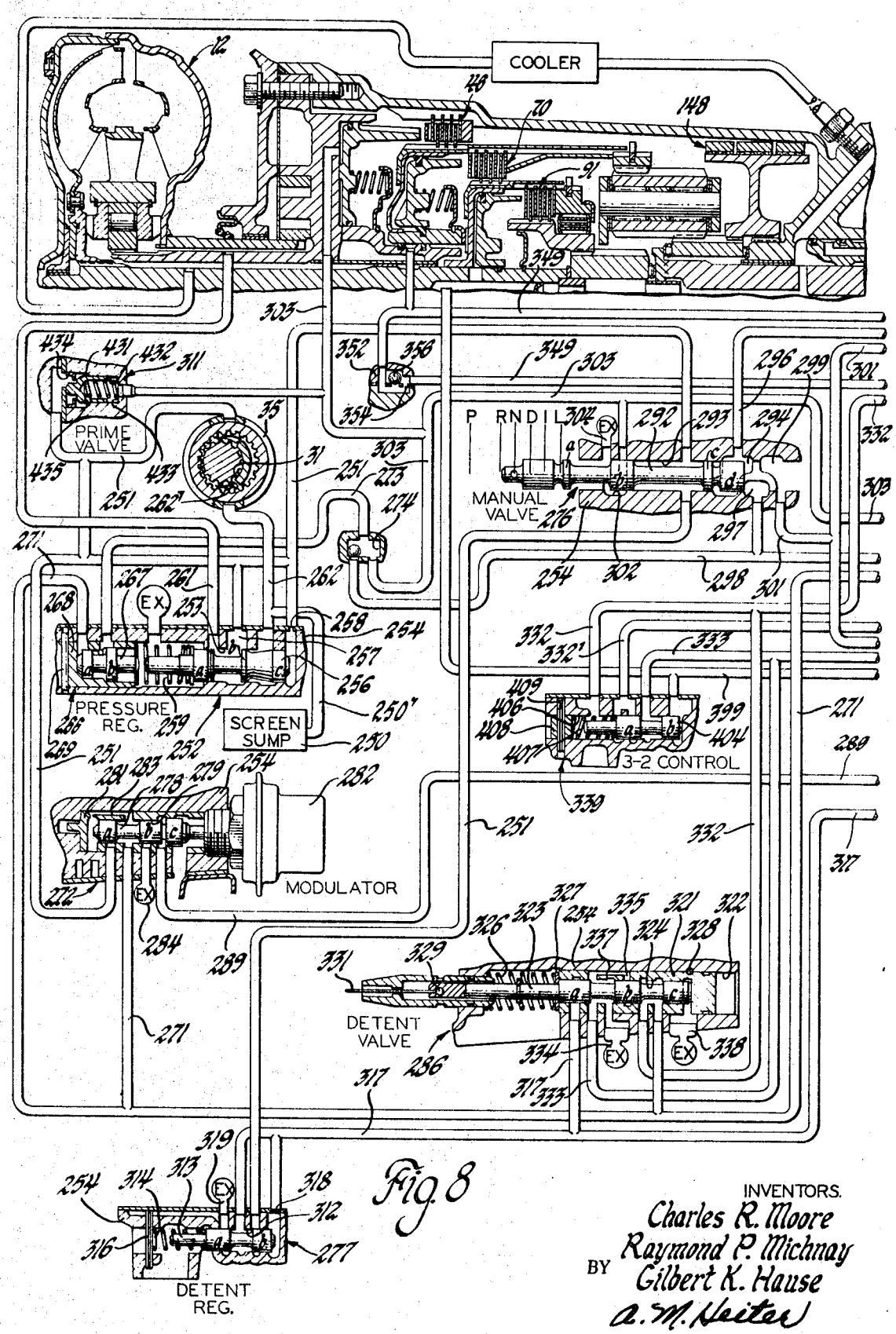

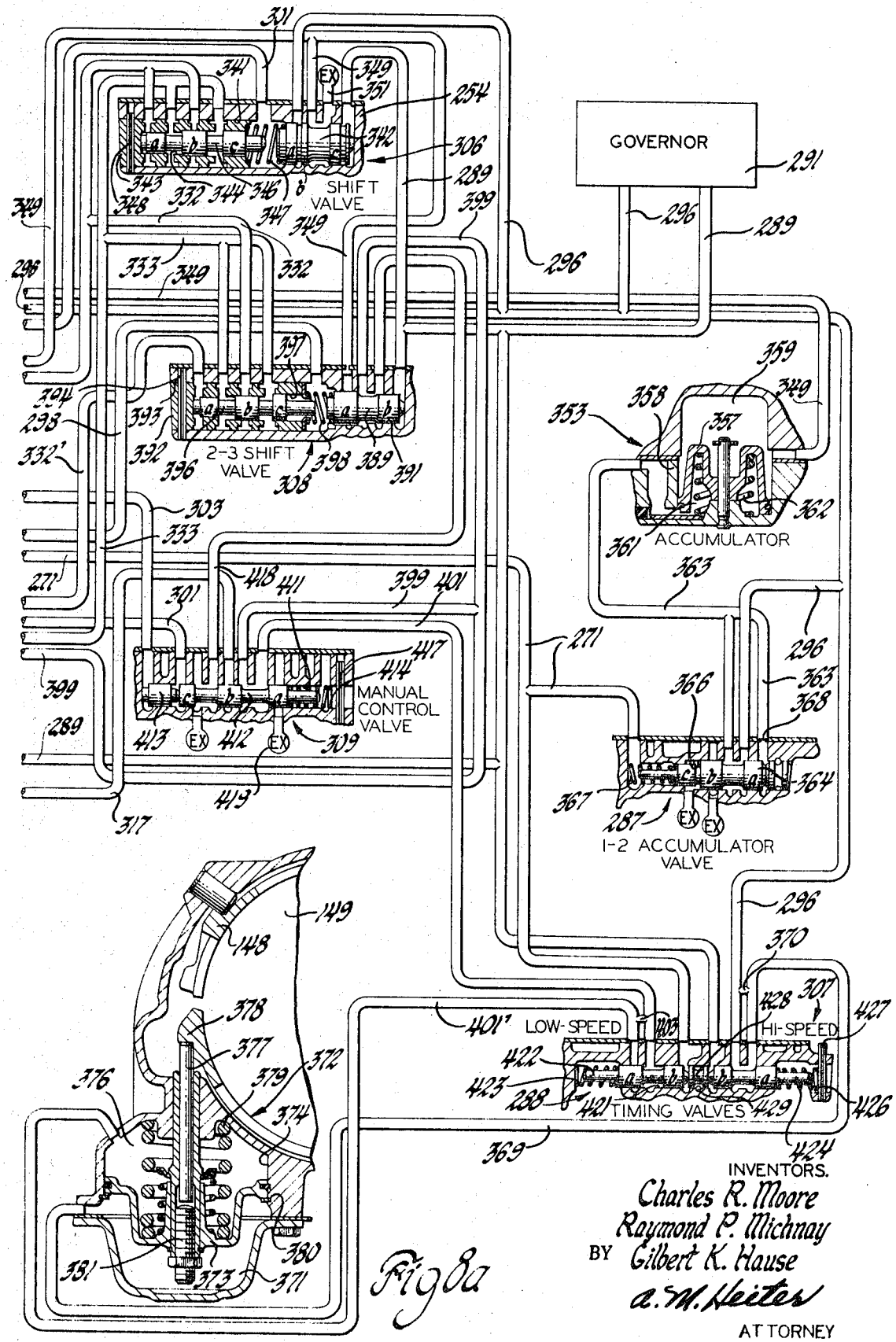

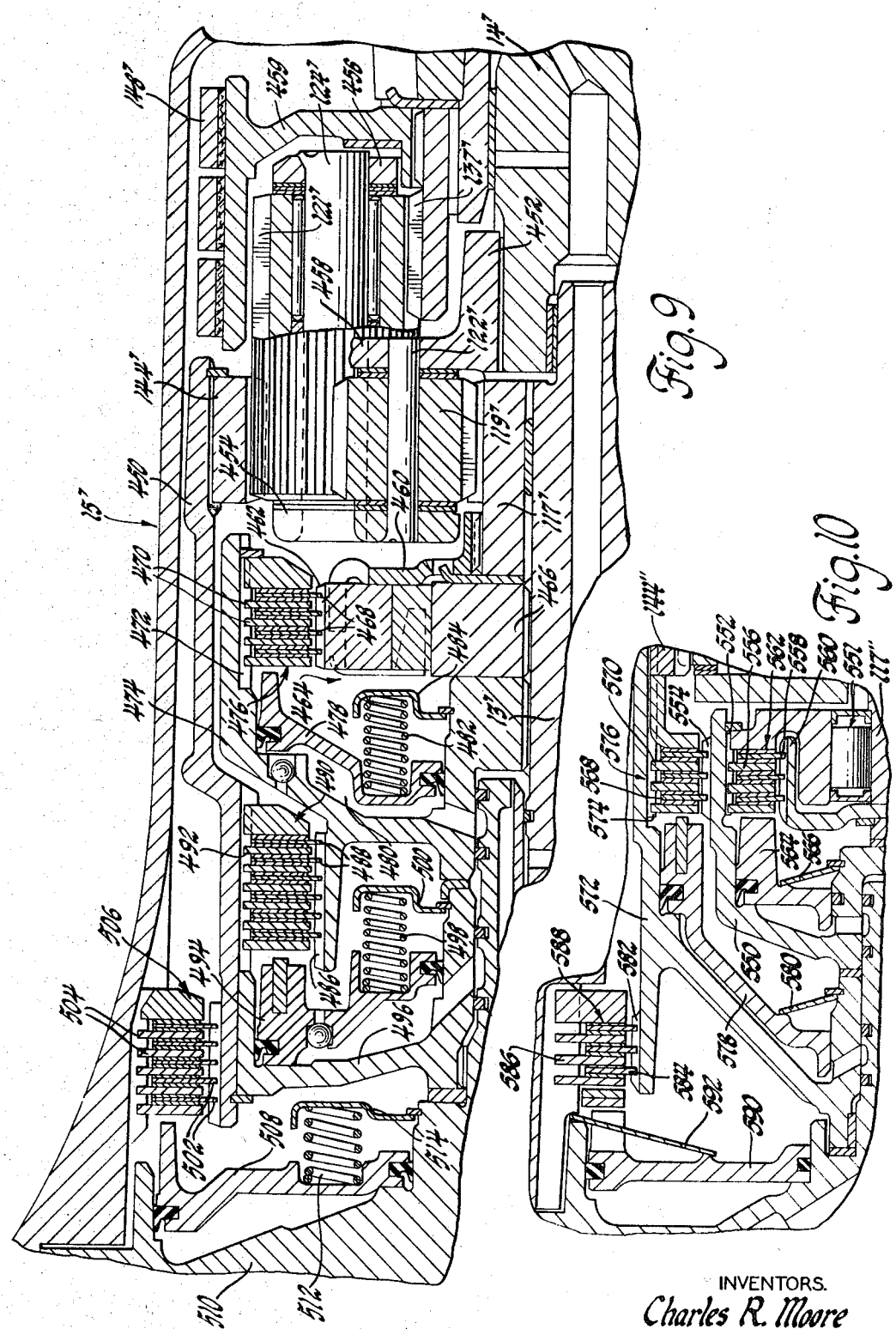

3,554,057
TRANSMISSION AND CONTROL
Raymond P. Michnay, Wiesbaden, Germany, and Charles R. Moore, Grosse Pointe Park, and Gilbert K. Hause, Bloomfield Hills, Mich., assignors to General Motors Corporation, Detroit, Mich., a corporation of Delaware
Filed Sept. 13, 1968, Ser. No. 759,671
Int. Cl. F16d *35/00;* F16h *47/08, 57/10*
U.S. Cl. 74—732
23 Claims

ABSTRACT OF THE DISCLOSURE

The transmission shown has a torque converter driving an input drum and a gear unit having an inner drum connected to an input sun gear meshing with a short pinion which meshes with a long pinion. Both pinions are mounted on the output carrier. The long pinion meshes with a reaction sun gear and with an input reaction ring gear splined to an outer drum and with a reaction sun gear. When the reaction sun gear is held, low ratio is provided by a one-way clutch in automatic low gear and by the one-way clutch and a direct clutch in manual low to provide engine braking. The direct clutch is located between the input drum and inner drum. The input during second ratio is provided by an intermediate clutch located between the input drum and the outer drum and the reaction is provided by the reaction sun gear. For third ratio, the reaction sun gear is released and both clutches drive. For reverse, the reverse plate brake between the outer drum and an outermost fixed housing drum and the direct clutch are engaged. The engagement of the direct clutch in reverse supplements the input to the gear set through the one-way clutch and prevents freewheeling in reverse gear. The direct clutch handles no torque except on coasting. The drums are concentrically arranged and successively longer from the short inner drum to the longest outermost fixed drum so the successively outer clutch and brake plate packs are further from the gear set and the fluid motor for operating each plate pack clears the inner drum and is within the outer drum for that plate pack. This motor and plate pack arrangement with sheet metal intermediate and outer drums, having rolled nested splines, provides within the space profile of this gear set space for three successively larger area motors and larger radius plate packs having the same number of plates to provide direct and second clutch torque capacity and reverse brake torque capacity which with a reverse pressure boost to match the torque requirements of this gear set. Also, the single plate area of each pack is successively larger and sufficient for durability. The concentric plate packs are made of sets of three different size plates stamped from a single blank. The carrier has a central plate member and a pair of side members welded to the faces of the plate with the short and long pinion shafts mounted on the plate and side members within the perimeter so three or four sets of pinions can be used in a small diameter gear set. The transmission housing is formed of a bell-shaped converter housing and gear housing securing together and clamping therebetween a wear plate and a one-piece wall structure jointly providing passages and the latter providing a pump and valve body, a stator shaft and motor portions.

In the transmission controls, the upshift and downshift bias signals are controlled to prevent hunting of the shift valve. A downshift control valve controls the operation of downshift bias signals such that some of the bias signals are disconnected from the shift valve during upshifted low torque demand operation. The control also directs fluid through the shift valve and a shift control valve to engage and disengage the friction torque establishing devices.

This invention relates to automatic transmissions and particularly to a compact arrangement of a multiratio gear unit having fluid operated motors and friction torque devices for establishing the ratios and hydraulic controls therefor.

This invention provides a simplified lower cost and more compact transmission gearing unit having fluid operated clutches and brakes for establishing a plurality of ratio drives at higher torque levels. Dual pinion planetary gearing having an inner input drum and an outer input drum with the torque converter driven input drum therebetween and the outermost fixed reaction drum are arranged in concentric relation with the direct clutch between the drive drum and the inner input drum, the intermediate clutch between the drive drum and the outer input drum and a reaction brake between the outer input drum and the reaction drum. The drums are concentrically arranged with each successive inner drum shorter than the adjacent outer drum to provide a space within the outer drum of each pair of drums for a fluid motor to actuate the plate pack of the clutch or brake between each pair of drums. Two of the drums, having plate packs inside and outside thereof, are formed of sheet metal with nested internal and external splines so there is a minimal space between the concentric clutch packs, so plates of sufficient area for durability will fit substantially within the gear set profile. Also the fluid motors, being located within successively larger drums, have successively larger areas and the clutch packs have successively larger radii so that the same pressure can be used to match the torque input requirements for the intermediate and high drives. The reverse reaction brake has a larger motor and larger diameter clutch plates and, with the increased reverse operating pressure, provide the higher required torque capacity for reverse reaction brake. Thus these three plate packs have sets of alternate and intermediate plates which will fit one within the other and thus may be stamped from a single blank. These plates and drums provide the maximum clutch plate area for these clutches and brake that can be provided within the transmission profile which is substantially the same as the gear unit profile.

This transmission structure also permits improved manufacturing operations. The intermediate and outer drums are formed by stamping or drawing a cylindrical drum member with a cup-shaped flange at one end and rolling the internal and external splines in the sheet metal cylindrical portion. Each set of three plates, one for the reverse reaction brake, the second for the intermediate clutch and the third for the direct clutch may be stamped from one blank since they concentrically fit one within the other.

The transmission housing structure has a converter housing which provides a pump cover and control system passage portion which is bolted to the open end gear housing and clamps therebetween a wall structure having a pump cavity with pump gears therein and a valve bore with a valve element therein and provide portions of some of the fluid motors and stator support shaft in a one-piece structure.

An object of this invention is to provide a multiratio gear unit having concentric motors and plate packs having the substantially same diameter in total as the gearing and proportioned by the number of plates to give the required torque capacity.

Another object of this invention is to provide a compact transmission gearing arrangement having concentric friction torque establishing plate packs splined to a rolled sheet metal cylinder having formed internal and external splines in nested relation for increased plate area within the gear unit profile.

Another object of this invention is to provide in a transmission having a gear unit and a plurality of successively longer and larger diameter concentric drums having a friction torque establishing plate pack between each adjacent pair of drums and an operating motor for each plate pack at the end of its inner drum and within its outer drum to provide motors of successively increasing area and plate packs of successively increasing radius having a torque capacity to match the torque capacity requirements of the gear set.

Another object of the invention is to provide in a torque converter and gear unit housing an improved three piece housing assembly having a bell-like torque converter housing and gear housing with a wall clamped therebetween providing in conjunction with the rear wall of the torque converter housing a pump cavity having pump gears therein, control valving and passages therefor.

These and other objects and advantages will become apparent from the following specification and drawings in which:

FIG. 1 is a cross sectional view of the transmission.

FIG. 2 is a partial enlargement of the gear set portion of FIG. 1.

FIG. 3 is a partial sectional view of FIG. 2 on the line 3—3.

FIG. 4 is a partial sectional view of FIG. 2 on the line 4—4.

FIG. 5 is a partial sectional view of FIG. 2 on the line 5—5.

FIG. 6 is a sectional view of FIG. 2 on the line 6—6.

FIG. 7 shows the arrangement of combined FIGS. 8 and 8A.

FIGS. 8 and 8A when combined as shown in FIG. 7 schematically show the hydraulic control system.

FIG. 9 is a cross sectional view of a modification of the transmission shown in FIGS. 1 and 2.

FIG. 10 is a partial view showing another modification of the clutch and brake arrangement.

FIG. 11 is a cross sectional view on the line 11—11 in FIG. 2.

Referring to the drawings, there is shown in FIGS. 1 and 2 a transmission having a housing 11, a torque converter 12, an input shaft 13, an output shaft 14 and a planetary gear set 15. The housing 11 has three components, a bell housing 16, a gear housing 17, and a rear extension 18. The bell housing 16 is adapted to be secured to an engine and houses the torque converter 11 which includes an impeller 19, a turbine 21, and a stator 22. The impeller 19 has a cover 23 welded thereto which is adapted to be piloted in and connected to the engine flywheel by a flex plate, not shown. The turbine 21 has a hub 24 splined to the input shaft 13 which is rotatably supported by a bearing member 20, welded to cover 23. The stator 22 is supported on a stationary shaft 26 by a one-way brake 27. The torque converter 12 drives in a conventional manner and has a torque multiplication phase and a coupling phase. During the torque multiplication phase, fluid forces on the stator blades are in a rotational direction such that the one-way brake 27 is locked and the stator 22 becomes a fluid reaction member and the turbine 21 rotates at a speed less than the impeller 19 but transmits an increased torque to the input shaft 24. During the coupling phase, the impeller 19, turbine 21 and stator 22 rotate at substantially the same speed to provide a one-to-one torque ratio between the engine and the input shaft 13.

The shaft 26 is an integral extension or part of the front wall 28 of the transmission housing. The wall 28 has an eccentric cavity 29 in which is mounted an internal-external type gear pump 31 which is driven by a pump shaft 32 secured to the impeller 19. Thus the gear pump 31 is rotated at engine speed as is the impeller 19. The front wall 28 fits in recess 30 in the gear housing 17. The bell housing 16 is secured to the gear housing 17 by a plurality of fasteners 33 to locate and clamp the wall 28 therebetween. A plurality of fasteners 34 secure the wall 28 to the bell housing 16. A sealing ring 36 between the bell housing 16 and the wall 28 prevent the fluid in the pump 31 from leaking radially outward and a seal member 37 prevents fluid leakage axially along shaft 32. A wear plate 35, between the bell housing 16 and wall 28, prevents pump wear of the bell housing and cooperates with recesses in the facing surfaces of the bell housing and wall to provide passages for a portion of the control system. As shown diagrammatically in FIG. 8 and structurally in FIG. 1, the sump 250 with a screen inlet therein is connected by inlet line 250' to the inlet passage 262 and continued through the wear plate 35 to line 262 to the crescent shaped inlet port 262' in the wear plate to the inlet cavity of pump 31. As best shown in FIG. 1, inlet passage 250' is a recess in the wall 28 covered by wear plate 35 and passage 262 is a recess in the rear wall of the converter housing 16 covered by wear plate 35. The outlet passage 251 is similarly formed in an adjacent plane not shown in section. Also, other passages to the regulator valve and cylinders are similarly formed.

The wall 28 also has an integral annular chamber 38 which houses a reverse brake piston 39 and cooperates therewith to form a fluid motor. A pair of annular seals 41 and 42, mounted in grooves on the piston 39, prevent fluid leakage from the chamber 38 past the piston 39. The piston 39 has an annular extension 43 which abuts a brake or alternate plates 44 and friction or intermediate plates 45 when hydraulic fluid in chamber 38 causes the piston 39 to move to the right. The alternate plates 44 are alternately spaced of intermediate plates 45 such that the plates 44 and 45 and piston 39 form a plate or brake pack for reverse brake 46. To increase the torque capacity of the reverse brake 46, the extension 43 may be shortened to permit the addition of more alternate plates 44 and friction plates 45. The alternate plates 44 have external teeth fitting splines 47 formed in the housing 17 and are stationary while the intermediate plates 45 have internal teeth fitting external spline 48 of a drum 49. Thus when the reverse brake 46 is engaged, the drum 49 is held stationary. A plurality of return springs 51 are mounted between the piston 39 and the spring retainer 52 which is positioned on the wall 28 to provide return motion for the piston 39 when the chamber 38 is not pressurized, thus maintaining the brake 46 in a disengaged position. A backup plate 54 is also splined to the gear housing 17 and rests against a shoulder 56 to limit the rightward movement of the plates 44 and 45 and the piston 39 when the brake 46 is engaged.

The drum 49 is formed from an elongated sheet metal cup having in the cylindrical portion nested external spline teeth 48 and internal spline teeth 58 rolled thereon, as best seen in FIG. 3. A hub member 59 is welded or otherwise secured at its flanged end 61 to the apertured cup bottom portion of the drum 49 and at its inner diameter 62 to a sleeve 63 which is rotatably supported on a hub 60 which is an integral extension of the wall 28. An intermediate clutch piston 64 is slidably mounted within the hub 59 and on the sleeve 63. A seal member 66, mounted on the piston 64, prevents fluid leakage between the piston 64 and the hub 59 while a seal 67, mounted in the sleeve 63, prevents fluid leakage between the sleeve 63 and the piston 64. Thus, a fluid chamber 68 is formed in which fluid pressure may be admitted to move the piston 64 to the right to provide a fluid motor to apply the intermediate clutch 70. Fluid pressure is admitted to chamber 68, through a passage 69, in sleeve 63 and a passage 71 in the hub 60 of the wall 28, from a fluid chamber 72 which is a cavity formed between wall 28 and a sleeve 73. A plurality of return springs 74 are compressed between the piston 64 and a spring retainer 75 fixed on sleeve 63 to urge the piston 64 to its leftward position shown when fluid pressure is not available in chamber 68 thereby maintaining the intermediate clutch 70 in a disengaged position. The piston 64 has an annular extension 76 at its outer diameter which engages a plurality of alternate or clutch plates 77 which are splined to the drum 49 by the internal teeth 58 thereof and intermediate or friction plates 78 which are splined on a plurality of external teeth 79 of a drum 81. The alternate plates 77 and intermediate plates 78 cooperate to form a clutch or plate pack for the clutch 70. The drum 81 is similar in construction to drum 49 being a cup-like member having an apertured bottom and a single elongated cylinder having nested external spline teeth 79 and internal spline teeth 82 rolled thereon. The major diameter of the internal spline 82 has a greater diameter than the minor diameter of the external spline 79 and the major diameter of the external teeth on the plate 104 meshing with the internal splines 82 has a greater diameter than the minor diameter of the internal teeth on the plate 78 meshing with the external splines 79. A hub member 83 is welded or otherwise secured to the flanged face of the drum 81 and the input shaft 13. Thus, when the intermediate clutch 70 is engaged, the drum 49 is drivingly connected to the input shaft 13 and when the reverse brake 46 is actuated, the drum 49 is grounded to the gear housing 17. A backup cylinder 84 is located inside the drum between a snap ring 86 and one of the clutch plates 77. The backup cylinder 84 is cylindrical at its right end 87 and is undulated having wave patterns 88 at its left end, as may be seen in FIG. 3. The cylindrical end 87 of backup cylinder 84 may be shortened to permit additional clutch and friction plates 77 and 78 to be added to the plate pack which will increase the torque capacity of the clutch 70.

Slidably mounted in the hub 83 and on the input shaft 13, is a direct clutch piston 89 which cooperates with the hub 83 to form a chamber 90 and thus provides a motor to apply a direct clutch 91. Seal member 92, held by the piston 89, prevents fluid leakage between the piston 89 and hub 83 while a seal member 93, mounted on the input shaft 13, prevents leakage between the shaft 13 and the piston 39. Fluid to energize the piston 89, thereby engaging the direct clutch 91, is admitted to chamber 90 via radial passage 94, axial passage 96 and radial passage 97 which communicates with a chamber 98, formed between the sleeve 73 and the input shaft 13. An opening 99, in the sleeve 73, communicates with a chamber 101 formed between the sleeve 73 and the wall 28. The right end of passage 96 is closed by a ball 102 which is pressed therein to prevent fluid from escaping. The piston 89 has an annular extension 103 at its outer diameter which is adapted to engage alternate or clutch plates 104 splined to the drum 81 at its inner splines 82 and intermediate or friction plates 106 which are mounted on splines 107 of a hub 108 which provides an inner race for a one-way clutch or sprag 111. The alternate and intermediate plates 104 and 106 cooperate to provide a plate or clutch pack for direct clutch 91. To increase the torque capacity of the direct clutch 91, the annular extension 103 may be shortened to provide space for additional plates 104 and 106. Also connected to splines 82 is an outer race 109 of the one-way clutch or sprag 111. The outer race 109 also provides a backup plate for the plates 104 and 106 and is held in location on the drum 81 by a snap ring 118 for this purpose. The sprag 111 is so constructed that whenever the input shaft 13 applies a torque to the sprag 111 in the drive direction, the sprag will torsionally lock the outer race 109 to the inner race or hub 108. Also, whenever direct clutch 91 is engaged, the hub 108 will be driven by both the sprag 111 and the direct clutch 91. A plurality of return springs 112 are compressed between the piston 89 and a spring retainer 113 which is positioned on the input shaft 13 by a snap ring 114 to maintain the direct clutch 91 in its disengaged condition when the chamber 90 is not pressurized. The hub 108 has a spline 116 at its inner diameter which drivingly connects the hub to an input sun gear 117.

As best seen in FIGS. 2, 5 and 6, the sun gear 117 meshes with a plurality of short pinion gears 119 which, in turn, mesh with a plurality of long pinion gears 121. The short pinions 119 are rotatably mounted on pins 122 by needle bearings 123 while the long pinions 121 are rotatably mounted on pins 124 by needle bearings 126 and 127. Both of the pins 122 and 124 are mounted in and secured to an output carrier 128. Thrust bearings such as 130 are provided between the end faces of pinion gear 119 and 121 to reduce the friction forces. The carrier 128 is formed with two annular cup members 129 and 131 which are welded to a central hub member 132 which is welded on the output shaft 14. The cup member 129 is formed from a single piece having a central aperture 133 which permits clearance for the sun gear 117 and a plurality of cutout sections 134 which allow the long pinions 121 to extend outside of the cup member 129 and carrier member 128. The cup member 131 is similar to the cup member 129. It also has cutout sections for the long pinions and a central aperture 136 which provides clearance for a reaction sun gear 137 which meshes with the long pinions 121. The reaction sun gear 137 is splined to a drum 147 and the assembly is supported by a hub formed on the transmission housing by means of a sleeve and bushing. Axial forces at the gear 137 are transmitted via the needle thrust bearings 138 and 139 between the hub 132 and output shaft 14 and the gear housing 17. Thrust forces introduced by or to the input sun gear 117 are transmitted by needle thrust bearings 141 and 142 between the hub 132 of the output shaft 14 and a thrust washer 143 which abuts the input shaft 13. Also meshing with the long pinion 121 is an input and reaction ring gear 144 which is drivingly connected by external splines to internal splines 58 of drum 49 and located axially by snap ring 86 and snap ring 145. Thus the ring gear 144 will provide a reaction member whenever the brake 46 is engaged or will provide an input member whenever the clutch 70 is engaged. The reaction sun gear 137 has the brake drum 147 splined thereon at 146. A double-wrap brake band 148, wrapped around the outer diameter 149 of the drum 147, provides a reaction connection for the reaction sun gear 137. The double-wrap band 148 may be constructed similar to that shown in the Vossler et al. U.S. Pat. No. 2,975,870.

A parking gear 151 is splined to the output shaft 14 at 152 and includes a hub portion 153 which is rotatably mounted in the gear housing 17 and has a governor inlet passage 154–157 to governor 291 and a governor outlet passage 156–158. Three seal rings 159, 161 and 162 separate the fluid in passage 157 from the fluid in passage 158 and prevent outward leakage of the fluid from the passages 157 and 158.

As best seen in FIGS. 2 and 5, the pins 122 and 124 extend through the cup member 131. A locking plate 166, having lock slots 167 and cam slots 168 which engage slots 169 and 171 in the pins 122 and 124 respectively. The lock slots 167 and cam slots 168 have circular portions 172 and 173 which are initially aligned with the pins 122 and 124. The locking plate is then rotated in the direction of arrow A so that the lock slots 167 and cam slots 168 engage slots 169 and 171 thereby preventing rotation and axial movement of the pins 122 and 124. Fasteners 176 are threaded into cup member 131 to prevent movement of the locking plate 166.

The brake plates 44, clutch plates 77 and 104 are concentric, as seen in FIG. 4 and have been designed so that the outer diameter of clutch plate 77 is less than the inner daimeter of brake plate 44 while the outer diameter of clutch plate 104 is less than the inner diameter of clutch plate 77. Thus, the three plates may be stamped from a single annular plate which has an outside diameter, the same as plate 44, and an inside diameter the same as the inside diameter of plate 104. The friction plates 45, 78 and 106 are similar in design to the plates 44, 77 and 104 with the exception that the splines are on the inside diameter. These plates are also stamped from a singular annular plate.

In this particular gear arrangement, the torque capacity requirements of the direct clutch 91, the second clutch 70 and the reverse brake 46, each being proportional to input torque, are substantially proportional to their mean radius so the same number of these plates are used in each of these friction torque means. Thus for higher input torque it is merely necessary to add the same number of plates to each friction device. The limiting torque capacity T of a plate type clutch or brake is a function of apply force F, friction coefficient $u$, means radius $r$ of the plate, and the number of active faces $n$. As shown, each active face has the same area and mean radius. This function is described by the folowing equation. $T=Furn$. Since $Fur$ remains the same in each friction device on increasing torque input the increased torque T of each friction device is accommodated by adding the same number of plates to each friction device. The clutches 70 and 91 and brake 46 of this transmission have been designed so that mean radius $r$ of the alternate plates 44, 77 and 104 and intermediate plates 45, 78 and 106 permit each set of alternate or intermediate plates to be stamped or otherwise formed from a single annular component. Also, the number of active faces $n$ is the same in each clutch or brake so that each plate pack has the same number of plates. Thus, a minimum amount of waste is occasioned when the plates are formed from a single sheet. The sheet metal drums 49 and 81 permit closer radial spacing of the plates of these friction torque means because the inner teeth of the outer one and the outer teeth of the inner one overlap.

The transmission is capable of either automatic shifting through three speed ratios or manual ratio change in forward drive. During automatic operation in first gear, the brake band 148 is applied thus preventing rotation of reaction sun gear 137. With the brake 148 applied, the power flow is from the engine through the impeller 19, to the turbine 21, through the input shaft 13, the hub 83, and the drum 81 to the outer race 109 of the sprag or one-way clutch 111. Since the input shaft is applying a torque to the sprag 111 in the drive direction, the sprag 111 will lock the outer race 109 to the inner race 108 so that the inner race 108 and input sun gear 117 are driven by the input shaft 13. Since the reaction sun gear 137 is stationary, the planet pinions 119 and 121 are urged to "walk-around" or orbit about the reaction sun gear 137 thereby causing the carrier 128 to rotate in the same direction as the input shaft 13, but at a reduced speed and a torque increase. Since the output shaft 14 is secured to the carrier 128, it also rotates in the same direction as the input shaft 13, but at a reduced speed and an increased torque. Also, during initial first gear operation, the stator 22 is stationary to provide additional torque multiplication between the engine and the output shaft 14.

To change from first gear to second gear, the clutch 70 is engaged. Thus the ring gear 144 is connected to the input shaft 13. The brake 148 remains engaged to maintain the sun gear 137 as a reaction member. Thus, as the ring gear 144 is driven by the input shaft, the planet pinions 119 and 121 are driven by the ring gear 144 so that they "walk-around" the reaction sun gear 137 driving the carrier 128 with them. During second gear operation, the carrier rotates at a reduced speed, but more rapidly than it did in first gear. Also, during second gear operation, the sun gear 117 is driven by the rotation of planet pinions 119 and 121 and rotates more rapidly than the input shaft 13. Thus, the inner race 108 of the sprag 111 rotates freely and more rapidly than the outer race 109 so that the sprag 111 is ineffective or in an overrunning condition. During second gear operation, the stator 22 may be either stationary to provide additional torque multiplication or the stator may be "freewheeling" with the torque converter 12 in "coupling phase."

To change from second to third gear, the brake 148 is disengaged and the clutch 91 is engaged while the clutch 70 remains engaged, thus input shaft 13 drives ring gear 144 and sun gear 117. The planetary gear set 15 is then in a locked up condition and rotates in the same direction as the input shaft 13 and at the same speed to drive the output shaft in the same direction at the same speed.

In low gear manual operation, the brake 148 is engaged and the clutch 91 is engaged. Thus the power path is the same as in automatic first gear except that the power flow is through the sprag 111, or through both the clutch 91 and the sprag 111 in parallel, to the sun gear 117. However, when the clutch 91 is engaged, a two-way connection is provided between the engine and the sun gear 117 so that engine braking is available in manual first gear. The transmission may be manually shifted from first to second gear disengaging clutch 91 while engaging clutch 70.

For reverse gear operation, the reverse brake 46 is engaged thus establishing the ring gear 144 as the reaction member of the planetary gear set 15, and the clutch 91 is engaged to prevent freewheeling of the sprag 111 in reverse during coasting. The planet pinions 119 and 121, driven by the sun gear 117, orbit within the inside of ring gear 144 in a direction opposite to the rotation of input sun gear 117, thereby driving the carrier 128 and output shaft 14 in a direction opposite to the input shaft 13.

Each of the above described clutches and brakes has a set of plates or a band providing a friction torque device. Each friction torque device and its operating motor provides a friction torque establishing device.

The intermediate and direct clutches 70 and 91 and the reverse and low brakes 46 and 148 are actuated by fluid pressure supplied by the hydraulic control system shown in FIGS. 8 and 8a. The internal-external gear pump 31 receives fluid from the sump with a screen 250 via suction line 250' or regulator valve exhaust port and inlet passage 262 and delivers fluid to the control system through main pressure passage 251. The pressure level of the fluid in passage 251 is established by the main pressure regulator valve 252.

The main pressure regulator valve 252 includes a valve bore 253, a valve body 254, and a valve spool 256 slidably mounted in the valve bore 253. The valve spool 256 has three equal diameter lands $a$, $b$ and $c$ which control the flow of fluid through the pressure regulator valve 252. The fluid in passage 251 is directed to ports 257 between lands $a$ and $b$ and through restriction 258 to the right end of valve land $c$. A spring 259 operates on the left end of land $a$ to apply a force to the valve until sufficient pressure in passage 251 is developed on the right end of land $c$ to move the spool 256 leftward against the force of spring 259. Leftward movement of the spool 256 initially opens the area between lands $a$ and $b$ to the torque converter feed passage 261. Further leftward movement of the valve spool 256 opens the area between lands $b$ and $c$ to the pump inlet passage 262 thereby discharging excess fluid flow from the pump 31 and regulating main line pressure in passage 251. During operation of the transmission, as engine torque requirements increase and/ or during reverse, manual intermediate or manual low drive ratios, it is necessary to increase the main regulator pressure above the level established by the spring 259. To provide this pressure increase, a modulator and intermediate-reverse boost valve 266 is used. The boost valve 266 includes a boost valve spool 267 having a small diameter land $a$ and a large diameter land $b$ slidably mounted in a sleeve 268 which is held in position in the valve bore 253 by a pin 269. To increase the main line regulator pressure with increasing engine torque, a modulator passage 271 directs fluid from the modulator valve 272 to the left end of boost valve spool 267 to move it to the right against the valve spool 256 thereby adding to the bias force created by spring 259. To provide a pressure increase during manual intermediate low or reverse operation, an intermediate-reverse boost passage 273 directs fluid from a boost control valve 274 to the boost valve spool 267 where it operates on the differential area between lands a and b to apply a force to the boost valve spool 267 to the right against the valve spool 256 thereby increasing the bias force. The main line pressure fluid in main passage 251 is also directed to the modulator valve 272, a manual shift valve 276 and through the manual shift valve 276 to a detent regulator valve 277.

The modulator valve 272 includes a valve spool 278 having two equal diameter lands a and b and a larger diameter land c slidably mounted in a bore 279 of a sleeve spool 281 which is held in the valve body 254 or the housing 17 and vacuum motor 282. When the valve spool 278 is moved to the left by the vacuum motor 282, the pressure fluid in main passage 251 is directed between lands a and b to the modulator passage 271 which is connected through a restriction passage 283 to the left end of valve spool 278 to move it to the right against the force of the vacuum motor 282 until the passage 251 is closed by land a and if the force from the pressure in passage 271 is greater than the force in the vacuum motor 282, the valve spool 278 continues to move to the right until an exhaust passage 284 is opened by land b. The vacuum motor 282 is of conventional design such that when engine vacuum is high, the force exerted on the spool 278 is low and the modulator pressure is low and when engine vacuum is low the vacuum motor force is high as is modulator pressure in passage 271. Besides directing modulator pressure through the boost valve 266, the modulator passage 271 also directs modulator pressure to the detent valve 286, a 1–2 accumulator valve 287 and a low-speed timing valve 288. To decrease the fluid pressure in modulator passage 271, governor pressure in governor passage 289, which delivers fluid pressure as a function of vehicle speed from a governor 291, operates on the differential area between lands b and c thereby decreasing the bias force of the vacuum motor force is high as is modulator pressure pressure.

The manual valve 276 is a manually operated valve including a valve spool 292 having four equal diameter lands a, b, c and d slidably mounted in a valve bore 293 in the valve body 254. The valve spool 292 is connected to a shift selector lever. The valve spool 292 is movable to five positions including park P, reverse R, neutral N, drive D, Intermediate I and low L. When the valve spool 276 is moved to drive D, main line pressure in main passage 251 is directed between lands b and c to a drive port 294 which is connected to a drive passage 296. When the valve spool 292 is moved to intermediate I, main line pressure in passage 251 is directed between lands b and c to the drive port 294 and between lands c and d to an intermediate port 297 which is connected to an intermediate passage 298. When the valve spool 292 is moved to the low L position, main line pressure in main passage 251 is directed between lands b and c to the drive port 294 and the intermediate port 297 and between lands c and d to a low port 299 which is connected to a low passage 301. When the valve spool 292 is moved to the reverse R position, the fluid in main passage 251 is directed between lands b and c to a reverse port 302 which is connected to a reverse signal passage 303. When the valve spool 292 is in the neutral N position, as shown, the reverse port 302 is exhausted at the left end of the spool while the drive port 294, intermediate port 297 and low port 299 are connected to exhaust at the right end of the valve bore 293. When the valve spool 292 is moved to the park P position, the valley between lands c and d is aligned with main passage 251 while the reverse port 302 is connected to exhaust port 304 between lands b and c and the drive, intermediate and low ports 294, 297 and 299 are exhausted at the right end of valve bore 293. The drive passage 296 is connected to a 1–2 shift valve 306, the governor 291, the 1–2 accumulator valve 287 and a high speed timing valve 307. The intermediate signal passage 298 is connected to the boost control valve 274 and to a 2–3 shift valve 308. The low passage 301 is connected to the 1–2 shift valve 306 and to a low-reverse control valve 309. The reverse passage 303 is connected to the boost control valve 274, the low-reverse control valve 309, the reverse brake 46 and a priming valve 311. Thus, whenever the manual valve 276 is moved to the reverse position, the reverse brake 46 is engaged.

The passage 251 is also connected, as mentioned above, to the detent regulator valve 277 which includes the valve bore 312, the valve spool 313 having equal diameter lands a and b slidably disposed in the valve bore 312 and a bias spring 314 compressed between the valve land a and a pin 316 secured in the valve body 254. The spring 314 moves the valve spool 313 to the right so that main passage 251 is open between lands a and b to a detent regulator passage 317. The detent regulator passage 317 is connected through a restriction 318 to the right end of the valve spool 313 to move it leftward against the force of spring 314 until the main passage 251 is closed by land b. If the fluid pressure, in detent passage 317, acting on the end of valve spool 313 is greater than the force imposed on the valve spool 313 by the spring 314, the valve spool 313 will continue to move leftward until the detent passage 317 is open to an exhaust passage 319 between lands a and b thereby relieving excess pressure in detent passage 317. Thus the detent regulator valve 277 establishes a constant detent pressure which is less than main line pressure in main passage 251. The detent passage 317 is also connected to the detent valve 286 and manual low-reverse control valve 309.

The detent valve 286 includes a sleeve valve 321 located in a bore 322, a valve spool 323 having equal diameter lands a, b and c slidably mounted in a bore 324 of the sleeve valve 321 and a compression spring 326 compressed between one end of bore 322 and a spring seat 327 which abuts the left end of land a. A pin member 328 is placed between the bore 322 and the sleeve valve 321 to locate the sleeve valve 321 in the bore 322. The valve spool 323 has a bore and slot 329 adjacent its left end into which is inserted one end of a pull cable 331 connected to an operator throttle pedal so that when the throttle pedal is fully depressed, the cable 331 will move the valve spool 323 to the left against the force of the spring 326 to establish a detent position. With the detent valve in the spring set position, as shown, the modulator passage 271 is open between lands b and c to a modulator-detent passage 332 while the detent passage 317 is closed by land a. Also, in the spring set position, a detent-exhaust passage 333 is connected between lands a and b to an exhaust port 334 and a secondary port 335 which is connected to the detent-exhaust passage 333 via a peripheral passage 337 which is also connected to exhaust. When the detent valve 286 is moved, by the operator, to detent position, the modulator passage 271 is closed by valve land c and the exhaust port 334 is closed by valve land b while the detent passage 317 is open between lands a and b to the detent-exhaust passage 333, and via peripheral passage 337 and secondary port 335 is also opened between lands b and c to the modulator-detent passage 332. An exhaust port 338 connects the right end of valve spool 323 and bore 324 to exhaust to prevent pressure buildup in this area due to fluid leakage past valve land c which could cause an undesirable movement to the detent valve 286 to the detent position. Thus, it is seen that during normal operation, the modulator detent passage 332 is filled with modulator pressure fluid and the detent exhaust passage 333 is vented and during detent operation, both passages 332 and 333 are filled with fluid at the detent regulator pressure. Also both of the passages 332 and 333 are connected to the 1–2 shift valve 306, the 2–3 shift valve 308 and a 3–2 downshift control valve 339. These passages provide downshift signals to the 1–2 and 2–3 shift valve and a hydraulic bias which controls the point at which the through detent 1–2 and 2–3 shifts are made.

The 1–2 shift valve 306 includes a bore 341 in valve body 254, a shift valve spool 342 having two equal diameter lands a and b and a smaller diameter land c slidably mounted in the bore 341, a shift control valve sleeve 343 having a stepped bore 344, a shift control valve spool 346 having small, intermediate and larger diameter lands a, b and c respectively, slidably mounted in bore 344, and a downshift bias spring 347 compressed between the right end of sleeve 343 and the land a of shift valve spool 342. The shift control valve sleeve 343 is located in the valve bore 341 by a pin 348. The 1–2 shift valve system functions to control automatic shifting between first and second ratio in the transmission or to maintain manual low ratio in the transmission. During normal automatic operation, modulator pressure in the modulator-detent passage 332 is connected to the left end of land a of shift control valve spool 346 to move it to its rightward position where it abuts shift valve spool 342 to provide a torque demand bias on the shift valve spool 342. Also, with the shift control valve spool 346 in its rightward or downshifted position, the modulator pressure in modulator-detent passage 332 is connected between lands a and b to operate on the differential area therebetween to provide an additional downshift bias. The detent-exhaust pasage 333 is also connected at two locations to the shift control valve spool 346. With the shift control valve spool 346 in the downshift position, one of these connections is blocked by valve land a of the shift control valve spool 346 and the other connection is open to the differential area between b and c of the shift control valve spool 346. During normal operation, however, the detent-exhaust passage 333 is exhausted so that no downshift bias is present. The shift valve spool 342 is operated on by governor pressure in governor passage 289 at the right end of land c of the shift spool 342. As vehicle speed and, therefore, governor pressure increase, the shift valve spool 342 and the shift control valve spool 346 will move leftward to the upshifted position when the governor pressure is sufficient to overcome the downshift spring 347 and the downshift bias provided by modulator pressure. When the shift valve spool 342 is in the downshifted position, as shown, main pressure in drive passage 296 is blocked by valve land a of the shift spool 342. When the shift spool 342 is in the upshifted position, main pressure in drive passage 296 is connected between lands b and c to an intermediate clutch passage 349. When the shift valve spool 342 is moved to the upshifted position, main line pressure operates on the differential area between lands b and c of the shift valve 342 to assist governor pressure and to provide an upshifted bias or hysteresis. When the shift control spool 346 is in the upshifted position, as shown, the modulator pressure connection between lands a and b of the downshift spool 346 is blocked by valve land b thus decreasing the modulator downshift bias. The hysteresis on the two valves prevents a "hunting" condition in the 1–2 shift valve by requiring an increase in modulator pressure to cause the 1–2 shift valve to downshift even if the governor pressure is held constant. When the 1–2 shift valve 306 is in the downshifted position, the intermediate clutch passage 349 is connected between lands b and c of upshift valve spool 342 to an exhaust passage 351. The intermediate clutch passage 349 is connected to the 2–3 shift valve 308, the low-reverse 1–2 shift valve 306 and through a clutch timing valve 352 to the intermediate clutch 70 and an accumulator 353. Thus, when the 1–2 shift valve 306 is upshifted, main line pressure is directed to intermediate clutch 70 so that it will engage.

The rate of engagement of the intermediate clutch 70 is controlled by the clutch timing valve 352 and the accumulator 353. The clutch timing valve 352 includes the restriction 354 and a ball-check valve 356. During engagement of the intermediate clutch 70, the fluid in intermediate clutch passage 349 maintains the ball-check valve 356 closed so that the fluid must flow at a control rate through restriction 354. When the intermediate clutch passage is exhausted, the ball-check 356 opens to permit rapid disengagement of the intermediate clutch 70. The accumulator 353 includes the piston 357 slidably mounted in a cylinder 358 so as to form an intermediate clutch control chamber 359 and an accumulator charge pressure chamber 361. The compression spring 362 is compressed in the charge chamber 361 between the piston 357 and one end of cylinder 358 which tends to move the piston 357 upward thereby reducing the volume control chamber 359 while increasing the volume in charge chamber 361. The charge chamber 361 is connected via an accumulator charge passage 363 to the 1–2 accumulator valve 287.

The 1–2 accumulator valve 287 includes a valve spool 364 having equal diameter lands a and b and a smaller diameter land c slidably mounted in a stepped bore 366 and a spring 367 compressed between one end of bore 366 in the land c. With the valve spool 364 in the spring set position, as shown, the drive passage 296 is connected between lands a and b to the accumulator charge passage 363 which permits main pressure in drive passage 296 to enter the accumulator charge passage 363. However, the accumulator charge passage 363 is also connected through restriction 368 to the right end of land a. As the pressure increases in charge passage 363, it fills chamber 361 and also acts on land a to move the valve spool 364 leftward against the force of spring 367. As the spool 364 moves leftward, the drive passage 296 is closed by land a and the accumulator charge passage 363 is open to an exhaust passage between lands a and b. Thus a regulated pressure less than main line pressure is established by the 1–2 accumulator valve. The accumulator controls the rate of pressure rise in the intermediate clutch 70 due to the fact that the accumulator chamber 359 must be filled before full main pressure is available to fully engage the intermediate clutch 70. The accumulator charge pressure varies with variations of engine torque demand. To accomplish this, the modulator pressure in modulator passage 271, which is a function of engine torque demand, is connected to the left end of valve land c to assist the spring 367 thereby increasing accumulator charge pressure in passage 363 as engine torque demand increases.

When the manual valve 276 is moved to the low L position, main pressure in low passage 301, as described above, is directed to the 1–2 shift valve 306 between the shift valve spool 342 and the shift control spool 346. With main pressure acting on the shift spool 342 to maintain it in its downshifted position, the 1–2 shift valve 306 cannot be upshifted by governor pressure since governor pressure never exceeds main pressure.

Also during low and intermediate operation, as described above, the brake 148 must be engaged. To accomplish the engagement of brake 148, main pressure in passage 296 is directed to servo apply passage 396 either via restriction 370 or the high speed timing valve 307, the operation of which will be described later.

The servo apply passage 369 is connected to an apply chamber 371 of a servo 372. The servo 372 is a piston 373, slidably mounted in a cylinder 374 so as to form the servo apply chamber 371 and a servo release chamber 376. The piston 373 has a piston rod 377 which abuts a lug 378 on the outer periphery of the double-wrap brake band 148. A return spring 379 maintains the piston 373 "bottomed" in the cylinder 374 against a snap ring 380. An adjusting screw 381 permits the brake band 148 to be adjusted so that it is fully applied after a predetermined movement of the piston 373. Also, if the brake band 148 should wear after it has been in operation, it may be readjusted with the adjusting screw 381. With the piston "bottomed" in the cylinder, the double-wrap band does not apply any braking force to the drum 149. Thus, the brake band 148 is disengaged and the servo 372 is in its released postion. However, when the manual valve 276 is shifted to drive, intermediate or low positions, main line pressure is developed in drive passage 296 which, as described above, is connected to servo apply passage 369 so that main line pressure will develop in the servo apply chamber 371. As main line pressure develops in the apply chamber 371, the piston 373 moves upward in the cylinder 374 causing the brake band 148 to tighten on the brake drum 149 thus engaging the low brake. The low brake remains engaged for both low and intermediate gear ratios. Thus, the movement of the 1-2 shift valve 306 from its downshift to upshift positions and vice-versa does not affect the operation of the servo 372.

The 2-3 shift valve 308 controls upshifting and downshifting between intermediate and third gear ratios in the transmission. It is similar in construction to the 1-2 shift valve having a shift valve spool 389 with a large diameter land $a$ and a small diameter land $b$ slidably mounted in a stepped-bore 391, a sleeve 392 located in a bore 393 by a pin 394 and a downshift valve spool 396 having lands $a$, $b$ and $c$ of small intermediate and large diameters respectively, slidably mounted in a stepped bore 397 in the sleeve 392. A downshift bias spring 398 urges the shift spool 389 to its downshifted position, as shown. Governor pressure in passage 289 operates on the right end of land $b$ of the upshift spool 389 to provide an upshift bias as a function of vehicle speed. A modulator-detent passage 332' is connected between the left end of land $a$ of shift control spool 396 is in the upshifted position shown, valve 339 to provide a downshift bias. During normal driving operations, when the shift control spool 396 is moved to the right to its downshifted position, a downshift bias is also present at the differential area between lands $a$ and $b$ from the modulator-detent passage 332. However, when the shift control spool 396 is in the upshifted position shown, the pressure in the modulator-detent passage 332 is disconnected from the shift control spool 396 by land $b$ thus providing a downshift hysteresis. When the detent valve 286 is moved to detent position, an additional bias pressure is present from detent-exhaust passage 333 which is connected to the differential area between lands $b$ and $c$ of the shift control spool 396 in both the upshifted and downshifted positions. When the shift control spool 396 is in the upshifted position shown, detent pressure in the detent-exhaust passage 333 is admitted to the differential area between lands $a$ and $b$ to provide an additional downshift bias. Thus during normal operation, modulator pressure is available at two areas to resist an upshift until governor pressure is sufficient to overcome the bias pressures and the downshift bias spring 398. During detent operation, a downshift bias is present at three areas of the shift control spool 396 to either resist upshift or to enforce downshift. When the shift spool 389 is moved to its upshifted position, main pressure in intermediate clutch passage 349 is directed between lands $a$ and $b$ to a direct clutch passage 399. Due to the differential area between lands $a$ and $b$, an additional upshift force or hysteresis is imposed in the shift spool 389 when it is in the upshifted position. The direct clutch passage 399 is connected to the manual low-reverse control valve 309, the 3-2 downshift control valve 339 and to the direct clutch 91. Thus, as the 2-3 shift valve moves to its upshifted position, main line pressure is admitted to the direct clutch 91 to enforce its engagement. The intermediate passage 298 is connected to the 2-3 shift valve 308 between the upshift and downshift spools 389 and 396 to force the shift spool 389 to its downshifted position and prevent a 2-3 upshift from occurring during operation in manual intermediate I.

Also during a 2-3 shift, the brake band 148 must be released. This is accomplished by directing main line pressure fluid in the direct clutch passage 399 through the manual low-reverse control valve 309 to a servo release passage 401 which is connected via an orifice 403 or through the low speed timing valve 288 to a servo release passage 401' which is connected to the servo release chamber 376. Thus, main line pressure is present in both the servo apply and servo release chambers 371 and 376 so that the piston 373 is substantially in hydraulic balance and the spring 379 causes a servo 372 to release.

The 3-2 downshift control valve 339 includes a valve spool 404 having equal diameter lands $a$ and $b$ slidably mounted in a valve bore 406 and a compression spring 407 compressed between valve land $a$ and a plug 408 which is secured in the valve bore 406 by pin 409. During normal operation with the valve position in the spring set position, as shown, modulator pressure in a modulator-detent passage 332, is directed to the left end of valve land $a$ to assist the spring 407 and past valve land $a$ to the modulator-detent passage 332'. The detent-exhaust passage 333, which is exhausted during normal operation, is connected between lands $a$ and $b$ and the direct clutch passage 399 is connected to the right end of land $b$ to urge the valve spool 404 to move to the left when the direct clutch 91 is applied. If the modulator pressure in passage 332 is sufficiently low, main line pressure in direct clutch passage 399 will move the valve spool 404 to the left thereby connecting modulator-detent passage 332' to exhaust via detent-exhaust passage 333 between lands $a$ and $b$ thus exhausting the downshift bias pressure which is present at land $a$ of the shift control valve 396. To obtain part throttle downshift, the modulator pressure in passage 332 must be increased sufficiently to assist the spring 407 in overcoming main pressure on land $b$ of valve spool 404 thus reconnecting modulator-detent passage 332' to modulator-detent passage 332. During detent operation, detent pressure is present in modulator-detent passage 332 to cause the 3-2 downshift control valve 339 to move to the position shown thus providing three downshift bias pressures, as described above.

The manual low-reverse control valve 309 includes a single diameter bore 411 having a valve spool 412 with equal diameter lands $a$, $b$ and $c$ and a plug valve 413 slidably mounted in the bore 411. The plug valve 413 is located between one end of valve bore 411 and the land $c$ and a compression spring 414 is located between the land $a$ and a pin 417. Thus the spring forces the spool 412 and the plug valve 413 leftward in the bore 411. The reverse signal passage 303 is connected to the manual low-reverse control valve 309 between the plug valve 413 and the one end of bore 411. When the manual valve 276 is moved to reverse, main pressure in passage 303 will shift the plug 413 and the spool 412 rightward against the spring 414. The low signal passage 301 is connected to the manual low-reverse control valve 309 between the plug valve 413 and the spool valve 412. When the manual valve 276 is moved to the low position, main pressure from low signal passage 301 causes the valve spool 412 to move to the right against spring 414 while the plug valve 413 remains in the position shown. In this position shown, the direct clutch passage 399 is connected between the lands $a$ and $b$ to the servo release passage 401 to the direct main line pressure from the 2-3 shift valve to the servo 372 when the 2-3 shift valve 308 is upshifted. The detent passage 317 is blocked by land $b$ when the low-reverse control valve 309 is in the spring set position. However, when main line pressure is available in either the low signal passage 301 or the reverse signal passage 303 to shift the valve spool 412, the detent pressure in detent passage 317 is open between lands $b$ and $c$ to a detent clutch apply passage 418 which directs fluid at detent pressure to the shift valve spool 389 between lands $a$ and $b$. The detent clutch apply passage 418 is connected between lands $a$ and $b$ of the shift spool 389 to the direct clutch apply passage 399; thus, during manual low or reverse operation, the direct clutch 91 is engaged by detent pressure. Also, when the low-reverse control valve 309 is shifted, the servo release passage 401 is connected between lands *a* and *b* to an exhaust port 419. Thus, during manual low operation, the servo 372 will be applied by the main pressure in servo apply passage 369 and the servo release chamber 376 will be exhausted via passages 401' and 401.

Under certain driving conditions, especially during coasting or during force downshift at high vehicle speeds, it is desirable to delay the engagement of the brake band 148 during a 3–2 downshift. The low speed and high speed timing valves 288 and 307 provide such a delay. The low speed timing valve 288 includes a bore 421, a valve spool 422 having equal diameter lands *a* and *b* slidably mounted in bore 421 and a compression spring 423 between one end of bore 421 and the valved land *a*. The high speed timing valve 307 has a valve spool 424 with equal diameter lands *a* and *b* also slidably mounted in valve bore 421 and a compression spring 426 held between land *a* of spool 424 and a pin 427 which is located in the valve bore 421. A plug 428 is positioned in valve bore 421, by a pin 429, between spools 422 and 424 to separate them.

The modulator passage 271 is connected to the right end of valve spool 422 between land *b* and plug 428 to provide a modulator pressure signal which will move the valve spool 422 to the left against the spring 423 when the modulator pressure is sufficiently high. The servo release passage 401 is connected between lands *a* and *b* of the valve spool 422 while the servo release passage 401' is closed at the low speed timing valve 288 by the land *a* of spool 422 when the low speed timing valve 288 is in the position shown. Thus, when the transmission control requires the downshift from third to intermediate gear ratio, the fluid in servo release chamber 376 must be exhausted through the restriction 403 thus delaying the application of brake band 148. This will occur during coasting or low throttle downshifts when the modulator pressure in modulator passage 271 is low. However, during high engine torque requirements when modulator pressure is high, the valve spool 422 will be moved to the left to provide free flow from passage 401' to passage 401 between lands *a* and *b* of valve spool 422.

Governor pressure in passage 289 is connected to the left end of valve spool 424 between land *b* and the plug 428. With the valve spool 424 in the position shown, drive passage 296 is freely connected through the servo apply passage 369 between lands *a* and *b* of the valve spool 424. Thus, main pressure in drive passage 296 is freely admitted to the servo apply chamber 371 during low speed operation. As governor pressure increases as a function of vehicle speed, the valve spool 424 will be moved to the right against spring 426. Thus, at higher vehicle speeds the land *b* of valve spool 424 closes drive passage 296 so that fluid directed to the servo apply passage 369 must pass through restriction 370 thus controlling the servo apply rate. Thus, at low throttle low speed operation, such as coasting, the application of brake band 148 is delayed and during high speed operation, the application of brake band 148 is delayed. However, there is an intermediate range at medium speeds and medium to full throttle settings where the high speed timing valve is not shifted while the low speed timing valve is shifted so that both the servo apply passage 369 and the servo release passage 401' are both open to free flow through the high speed timing valve 307 and the low speed timing valve 288 respectively. Thus, the brake band 148 will be applied rapidly in this intermediate range.

When the vehicle is initially started, there may be some air trapped in the pump inlet passage 262 which must be expelled before the pump can create enough suction to lift the oil from the sump. The priming valve 311 provides this function. The priming valve consists of a spool valve 431 slidably mounted in a valve bore 432 and forced to the left by a spring 433 against the seat 434. The spool valve 431 has a restriction 435 which connects main line 251 at the left side of the poppet to the reverse signal line 303 of the right side of the poppet valve 432. When the pump 31 is initially rotated, the air trapped in the inlet passage 262 is delivered via main passage 251 through restriction 435 to the reverse passage 303 which is exhausted at the manual valve 276. However, when hydraulic pressure begins to develop in passage 261, the spool valve 432 is moved to the right against the spring 433 so that the restriction 435 is closed and no hydraulic fluid can escape to exhaust.

The planetary gearing and friction drive establishing devices shown in FIG. 9 are a modification of those shown in FIGS. 1 and 2. The planetary gearing 15' includes an input sun gear 117' rotatably journaled on an input shaft 13', an input-reaction ring gear 144' splined to a drum 450, a plurality of intermeshing long and short pinions 121' and 119' meshing with the ring gear 144' and the sun gear 117' respectively and a reaction sun gear 137' which meshes with the long pinions 121'. The long and short pinions 121' and 119' are rotatably mounted on long and short pinion support pins 124' and 122' respectively which are secured in a three piece carrier 452. The carrier 452 has two flanges 454 and 456 which provide axial support for the long pinions 121' and a central plate member 458 which is splined to the output shaft 14' and cooperates with the flange 454 to provide axial support for the short pinions 119'. The reaction sun gear 137' is splined to a breake drum 459 which is encircled by a double-wrap brake band 148' which is selectively engageable to prevent rotation of the reaction sun gear 137'.

A hub 460 is splined to the sun gear 117' and secured to the outer race 462 of a one-way device 464. The inner race 466 of the one-way device 464 is splined to the input shaft 13', thus providing a one-way drive between the input shaft 13' and the sun gear 117'. A plurality of intermediate friction plates 468 are splined to the outer race 462. Alternately spaced of plates 468 are a plurality of alternate clutch plates 470 which are splined to an internal spline 472 of a drum 474 and cooperate with the intermediate plates 468 to form a plate pack for a direct clutch 476. Also a component of the direct clutch 476 is a piston 478 slidably mounted in a chamber 480 in the drum 474 to form a fluid operated expansible motor. A plurality of springs 482 are held in compression between the piston 478 and a retainer 484 mounted on the drum 474 to maintain the clutch 476 disengaged until pressure fluid is admitted to the chamber 480. The drum 474 is splinded at its inner diameter to the input shaft 13' and has an external spline section 486 at which is splined a plurality of intermediate friction plates 488 of an intermediate clutch 490. A plurality of alternate clutch plates 492 are interspaced with the plates 488 and cooperate therewith to form a plate pack for the clutch 490. The intermediate clutch 490 is engaged by fluid acting on a piston 494 which is slidably mounted in a clutch hub 496 and disengaged by a plurality of springs 498 held in compression between the piston 494 and a retainer 500 which is located on the clutch hub 496. The alternate clutch plates 492 are splined to the drum 450 so that when the clutch 490 is engaged, the drum 450 and the ring gear 144' are driven by the input shaft. Also splined to the drum 450 are a plurality of intermediate friction plates 502 which are spaced with alternate brake plates 504 and cooperate therewith to form a plate pack for a reverse brake 506. The brake plates 504 are splined to the housing 17' so that when the brake 506 is engaged the drum 450 and the ring gear 144' are restrained from rotation to provide a reaction member for the gear set 15' duing reverse drive. The brake 506 is engaged by a fluid operated expansible motor which includes a piston 508 slidably mounted in the front wall 510 and disengaged by a plurality of springs 512 compressed between the piston 508 and a retainer 514 located on the front wall 510.

The planetary gear set 15' provides the same ratios in the same manner as planetary gear set 15 shown in FIG. 2 and described above. Also, the control system previously described will provide manual and automatic shifting for the clutches and brakes associated with planetary gear set 15'. The arrangement of the intermediate and low clutches 490 and 476 and the reverse brake 506 permits the use of a smaller overall diameter in the housing 17'.

Shown in FIG. 10 is another modification of the clutch and brake arrangement which may be used with this transmission. An intermediate clutch drum 550 is drivingly connected to the input shaft and has internal and external splined portions 552 and 554 respectively. A plurality of alternate clutch plates 556 are splined at the internal portion 552. Spaced with the plates 556 are a plurality of intermediate plates 558 which are splined to a hub 560 which is secured to the input sun gear 117''. The plates 556 and 558 cooperate to form a plate pack for a direct clutch 562. The direct clutch 562 is engaged by a fluid operated piston 564, slidably mounted in the drum 550 and cooperates therewith to form a fluid motor, and disengaged by a Belleville type spring 566 which is located on the drum 550. The drum 550 is also splined to the outer race of a one-way clutch 551, the inner race of which is formed on the input sun gear 117''. Thus a one-way drive is provided between the input shaft and the sun gear 117'' when the clutch 562 is disengaged and a two-way drive is provided therebetween when the clutch 562 is engaged.

A plurality of intermediate plates 568 are splined at the outer portion 554 of the drum 550. Alternately spaced of the plates 568 are a plurality of alternate plates 570 which are splined to an outer drum 572 through an internal spline 574. The plates 568 and 570 cooperate to form a plate pack for an intermediate clutch 576. The clutch 576 is engaged by a fluid operated piston 578, which is slidably mounted in the drum 572 and cooperates therewith to provide a fluid motor, and disengaged by a Belleville type spring 580 which is located on the drum 572. The spline 574 is also connected to the ring gear 144'', thus providing an input to the ring gear 144'' when the clutch 576 is engaged.

The drum 572 also has an external spline 582 to which is connected a plurality of intermediate plates 584. Alternately spaced of the plates 584 are a plurality of alternate plates 586, which are splined to the transmission housing and cooperate with the plate 584 to form a plate pack for a reverse brake 588. The brake 558 is engaged by a fluid operated piston 590, which is slidably mounted in the end wall of the transmission housing and cooperates therewith to form a fluid motor, and is disengaged by a Belleville type spring 592 located on the transmission housing.

It should be understood that the invention is not limited to the exact details of construction shown and described, for obvious modifications will occur to those skilled in the

What is claimed is:

1. In a transmission; housing means; input means providing an input torque; output means for delivering an output torque; multiratio planetary gear means having a plurality of members operatively connected between said input and output means to provide a plurality of torque ratios therebetween and having input and reaction torque requirements; and plurality of friction torque establishing means including an intermediate sheet metal drum having rolled internal-external nested splines and operatively connected to one of said members; an inner drum having external splines and connected to a second member, an outer drum having internal splines and connected to a third member, and disc members for establishing said torque ratios and being coaxially aligned with said input means and concentrically located within said housing means and being disposed between said inner and intermediate drums and between said intermediate and outer drums, said friction torque establishing means having torque capacities substantially proportional to the torque requirements and each friction torque establishing means having the same number of disc members.

2. In a transmission housing means; an input member providing an input torque; an output member for delivering an output torque; multiratio gear means operatively connecting said input and output means to provide a plurality of torque ratios therebetween and having a plurality of members having input and reaction torque requirements; and a plurality of friction torque establishing means including inner, intermediate and outer drive means each connected to one of said members concentrically located with the outer drive means having substantially the same maximum diameter as the maximum diameter of said gear means, a first pack of disc members having engageable annular friction surfaces and located between said intermediate and inner drive means, a second pack of disc members having engageable annular friction surfaces and located between said intermediate and outer drive means, first drive connecting means connecting one of said first pack of disc members to said inner drive means, second drive connecting means connecting one of said second pack of disc members to said outer drive means and third drive connecting means connecting said intermediate drive means to another of said disc members of both said first and second packs in the same annular area to minimize the space between said annular friction surfaces.

3. The invention defined in claim 2 and said third drive connecting means being nested inner and outer splines on said intermediate drive means and meshing outer teeth on said another disc of said first pack and inner teeth on said another disc of said second pack.

4. The invention defined in claim 2 and said plurality of friction torque establishing means including a first and a second annular motor fitting respectively within said intermediate and outer drive means and having an inner diameter at least as small as said inner drive means to provide a second motor having a larger area than the first motor.

5. The invention defined in claim 2 and said plurality of friction torque establishing means including first and second motors respectively operating said first and second packs of discs, said second motor having a larger area than said first motor, said second pack of discs having a larger mean radius than said first pack of discs for providing a friction torque capacity for each friction torque establishing means matching said torque requirements of said members.

6. In a transmission; multiratio gear means having an input member, an output member, a plurality of gear members and means connecting said members having a plurality of friction torque establishing means operative to establish a plurality of ratio drives including an intermediate sheet metal drum having rolled internal-external nested splines and operatively connected to one of said members; an inner drum having external splines and connected to a second member, an outer drum having internal splines and connected to a third member, a first pack of plates having alternate plates splined to the internal splines of said intermediate drum and intermediate plates splined to the external splines of said inner drum, and a second pack of plates having alternate plates splined to the internal splines of the outer drum and intermediate plates splined to the external splines of the intermediate drum.

7. The invention defined in claim 6 and said alternate and intermediate plates of said second pack having a larger internal diameter than the external diameter of said alternate and intermediate plates, respectively, of said first pack.

8. The invention defined in claim 7 and said intermediate plates of said second pack having a smaller inner diameter than the external diameter of said alternate plates of said first pack.

9. The invention defined in claim 6 and the major diameter of said internal splines of said intermediate drum having a greater diameter than the minor diameter of said external splines.

10. The invention defined in claim 6 and said gear means including a fixed reaction member; an outermost internally splined drum connected to said reaction member; said outer splined drum having nested internal and external splines and a plate brake having alternate plates splined to the internal splines of said outermost drum and intermediate plates splined to the external splines of said outer drum.

11. The invention defined in claim 6 and each intermediate plate having a smaller inner diameter than the external diameter of the next smaller alternate plate and the large alternate and intermediate plates having a larger internal diameter than the external diameter of the next smaller alternate and intermediate plates respectively.

12. The invention defined in claim 6 and a first fluid motor located within said intermediate drum having a piston engaging said first pack; a second annular fluid motor located within said outer drum having a piston engaging said second pack and each motor having an outer diameter substantially equal to the diameter of the drum in which it is located and an inner diameter less than the diameter of said inner drum.

13. A transmission including housing means; input means for providing input torque; output means for delivering output torque; multi-ratio planetary gear means including an input member receiving an input torque, an input and reaction member receiving an input torque in one ratio and absorbing a reaction torque in another ratio, and an output member drivingly connected to said output means; first drum means secured to and concentric with said input means; second drum means rotatably supported on said housing means concentric with said input means and said first drum means and drivingly connected to said input and reaction member; first multiple disc clutch means selectively drivingly connectable between said first drum means and said input member for delivering input torque to said input member; second multiple disc clutch means selectively drivingly connectable between said first drum means and said second drum means for delivering input torque to said input and reaction member during said one ratio; and multiple disc brake means selectively operatively connectable between said housing means and said second drum means to absorb a reaction torque of said input and reaction member during said another ratio, said first and second clutch means and said brake means being coaxial and having torque capacities which permit the same number of discs to be used in each.

14. The invention defined in claim 13 and said input member being a sun gear and said input and reaction member being a ring gear.

15. In a transmission; an input member; an output member; planetary gear means having an input gear, an input and reaction gear, a reaction gear and an output member operatively connected to drive said ouput shaft; means to hold said reaction gear for forward reduction ratios; an inner drum having external splines operatively connected to said input gear; an intermediate drum having internal and external splines operatively connected to said input member; an outer drum having internal and external splines operatively connected to said input and reaction gear; an outermost fixed drum having internal splines; a first clutch having a plate splined to said splines of said intermediate drum and a plate splined to said internal splines of said intermediate drum; a second clutch having a plate splined to said external splines of said intermediate drum and a plate splined to said internal splines of said outer drum; a reaction brake having a plate splined to said external splines of said outer drum and a plate splined to said splines of said outermost fixed drum; said drums being arranged in concentric overlapping relation with each outer drum extending axially beyond the next inner drum; a first fluid motor located within said intermediate drum operatively connected to engage said first clutch; a second fluid motor located within said outer drum operatively connected to engage said second clutch; and a third fluid motor located within said outermost fixed drum operatively connected to engage said reaction brake.

16. In a transmission, an input member; an output member; a planetary gear unt having an input sun gear and a reaction sun gear, a short pinion meshing with said input sun gear, a long pinion meshing with said short pinion and said reaction sun gear, a ring gear meshing with said long pinion, a carrier rotatably mounting said long and short pinions and attached to said output member; an inner drum having external splines and operatively connected to said input sun gear; an intermediate drum having internal and external splines and operatively connected to said input member; an outer drum having internal and external splines and operatively connected to said ring gear; an outermost fixed internally splined drum; said drums being arranged in concentric overlapping relationship; a first fluid operated brake operative to hold said reaction sun gear; a first clutch having alternate plates splined to said intermediate drum and intermediate plates splined to said inner drum and a first small area fluid motor within the intermediate drum; a second clutch having alternate plates splined to said outer drum and intermediate plates splined to said intermediate drum and a second larger area fluid motor within the outer drum; a second fluid operated brake having alternate plates splined to said outermost drum and intermediate plates splined to said outer drum; each alternate plate and each intermediate plate has an outer diameter fitting within the inner diameter of the next larger plate; the torque requirements imposed upon said first clutch and second clutch by said planetary gear unit being substantially proportional to the product of the area of said first and second fluid motors and the mean radius of the respective first and second clutch plates; said first and second clutches having the same number of alternate and intermediate plates having substantially the same radial width.

17. In a transmission; a driving element; an input shaft; an output shaft; a bell housing having an opened end, a flared portion and an end wall portion having a central opening; a gear housing having a rear wall, a generally cylindrical wall portion having an opened end portion and a sump in the bottom portion; a separate one piece front wall member having a central stator sleeve extended forwardly through said opening in said end wall portion and located by said opened end portion; a wear plate between said front wall and said end wall; securing means extending through said end wall and secured to said gear housing to clamp said wear plate and front wall between said end wall and said opened end portion of said gear housing; a torque converter having a pump element driven by said driving element, a turbine element driving said input shaft rotatably mounted in said stator sleeve and a stator mounted on said stator sleeve; gear means mounted in said gear housing operatively connecting said input shaft to drive said output shaft and having a plurality of fluid operated friction torque establishing means to establish a plurality of ratios one of said fluid operated friction torque establishing means having an annular cylinder formed by two annular walls integral with said front wall member; a pump including a pump recess in the front face of said front wall member and a pump rotor therein covered by said wear plate; control valve means for selectively supplying said fluid operated friction torque establishing means; passage means for supplying fluid from said sump to said pump and connecting said pump to said control valve means including a passage portion in said gear housing connecting said sump to said front wall member, passage recesses in the rear face of said end wall and the front face of said front wall separated by said wear plate and apertures in said wear plate; and a pump sleeve shaft operatively connecting said turbine to drive said pump rotor.

18. The invention defined in claim 17 and said front wall member having a valve bore therein and said control valve means including a pump pressure regulator valve in said bore.

19. The invention defined in claim 17 and said stator sleeve being an integral part of said one piece front wall member; one fluid operated friction torque establishing means including a short outer cylindrical wall and a longer inner integral cylindrical wall being an integral part of said one piece front wall member and an annular piston between said cylindrical walls and another fluid operated friction torque establishing means including an annular piston in an annular cylinder rotatably mounted on said inner cylindrical wall.

20. In a transmission; input means including an input shaft and an input drum fixed for rotation with said input shaft and mounted concentrically therewith; output means includuing a planetary carrier; an input sun gear; a short pinion rotatably mounted on said carrier meshing with said sun gear; a long pinion rotatably mounted on said carrier and having one portion meshing with said short pinion; a reaction sun gear meshing with another portion of said long pinion, a ring gear meshing with a portion of said long pinion, brake means for retarding said reaction sun gear; hub and one way drive means drivingly connected to said input sun gear and extending between said input drum and said input shaft including a one-way clutch drivingly connecting said input means and said input sun gear; a first fluid operated friction clutch means selectively operable for connecting said input drum and said sun gear drum having alternate plates connected to said input drum and said sun gear drum and a cylinder between said input shaft and input drum having a piston therein engaging said plates; a ring gear drum operatively connected to said ring gear and extending beyond said input drum; a second fluid operated clutch means selectively operable for connecting said input drum to said ring gear drum including a plurality of plates with alternate plates connected to said input drum and said ring gear drum, a cylinder within said ring gear drum and a piston in said cylinder operative to engage said second clutch plates; and fluid operated brake means operatively connected to said ring gear drum for retarding said ring gear drum.

21. The invention defined in claim 20 and said transmission further including a housing having an end wall with said fluid operated brake means including alternate brake plates connected to the outer diameter of said ring gear drum and said housing and a cylinder in said end wall having a piston therein engaging said brake plates.

22. The invention defined in claim 20 and said end wall having a sleeve portion concentric with said input shaft and rotatably supporting said ring gear drum.

23. A transmission including housing means, input means, output means, gear means drivingly connected to said output means, first drum means drivingly connected to and concentric with said input means including an outer cylindrical shell; an annular end wall extending radially inward from said cylindrical shell; a radial hub member secured adjacent its outer diameter to said end wall; and inner and outer drive connecting means comprising internal and external spline teeth on said cylindrical shell with the major and minor diameters of said internal spline being circumjacent the major and minor diameters of said external spline respectively and the minor diameter of said external spline having a smaller radial dimension than the major diameter of said internal spline, second drum means drivingly connected to said gear means and rotatably supported on said housing means concentric with said input means and said first drum means and having inner and outer drive connecting means, first multiple disc clutch means selectively drivingly connectable between said gear means and said inner drive connecting means of said first drum means, second multiple disc clutch means selectively drivingly connectable between said outer drive connecting means of said first drum means and said inner drive connecting means of said second drum means, and multiple disc brake means selectively operatively connectable between said housing means and said outer drive connecting means of said second drum means, said first and second clutch and said brake means being coaxial and each having an equal number of discs.

References Cited

UNITED STATES PATENTS

| | | | |
|---|---|---|---|
| 3,047,115 | 7/1962 | Lee et al. | 192—110X |
| 3,069,929 | 12/1962 | Hansen | 74—785 |
| 3,101,011 | 8/1963 | Tuck et al. | 74—732 |
| 3,186,081 | 6/1965 | Barisch | 29—434 |
| 3,253,688 | 5/1966 | Livezey | 74—759X |
| 3,275,108 | 9/1966 | General et al. | 192—3.3 |
| 3,279,573 | 10/1966 | Hensel | 192—87.11 |
| 3,307,430 | 3/1967 | Bauder | 192—87.11X |
| 3,313,385 | 4/1967 | Forster | 192—89X |
| 3,338,358 | 8/1967 | Christenson et al. | 192—89X |

ARTHUR T. McKEON, Primary Examiner

U.S. Cl. X.R.

74—761; 192—87.11

FO-1050
(5/69)

UNITED STATES PATENT OFFICE
CERTIFICATE OF CORRECTION

Patent No. 3,554,057      Dated January 12, 1971

Inventor(s) Charles R. Moore, Raymond P. Michnay, Gilbert K. Hause

It is certified that error appears in the above-identified patent and that said Letters Patent are hereby corrected as shown below:

Column 5, line 36, "provides" should read -- provide -- ;

Column 6, line 70, "daimeter" should read -- diameter -- ;

Column 7, line 14, "means" should read -- mean -- ;

Column 9, line 40 and 41, delete "force is high as in modulator pressure pressure." and insert -- 282 which causes a decrease in modulator pressure. -- ;

Column 11, line 9, "larger" should read -- large -- ;

Column 12, line 15, after 'volume' insert -- in -- ;

line 60, delete "passage 396" and insert -- passage 369 -- ;

Column 13, line 2, after 'band' insert -- 148 -- ;

line 32, delete "is in the upshifted position shown" and insert -- and the 3-2 downshift control -- ;

Column 15, line 15, delete "valved" and insert -- valve -- ;

Column 16, line 7, delete "passage 261" and insert -- passage 251 -- ;

line 48, delete "splinded" and insert -- splined --;

line 69, delete "duing" and insert -- during -- ;

Column 17, line 46, delete "brake 558" and insert -- brake 588-

Signed and sealed this 29th day of June 1971.

(SEAL)
Attest:

EDWARD M. FLETCHER, JR.      WILLIAM E. SCHUYLER, JR.
Attesting Officer      Commissioner of Patents